United States Patent
Niewels

(10) Patent No.: US 7,421,310 B2
(45) Date of Patent: Sep. 2, 2008

(54) METHOD AND APPARATUS FOR CONTROLLING COOLING RATES DURING POST-MOLD COOLING OF A MOLDED ARTICLE

(75) Inventor: Joachim Johannes Niewels, Thornton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 150 days.

(21) Appl. No.: 11/450,990

(22) Filed: Jun. 12, 2006

(65) Prior Publication Data

US 2007/0288120 A1 Dec. 13, 2007

(51) Int. Cl.
*G06F 19/00* (2006.01)
*B29C 33/02* (2006.01)
*B29C 45/78* (2006.01)

(52) U.S. Cl. .................. 700/205; 425/547; 264/328.14

(58) Field of Classification Search .............. 700/197, 700/200–205; 425/533, 547, 574–576, 572; 264/297.8, 328.8–328.16, 334
See application file for complete search history.

(56) References Cited

U.S. PATENT DOCUMENTS

| | | | |
|---|---|---|---|
| 3,488,801 A | 1/1970 | Havely | |
| 3,854,921 A * | 12/1974 | Jones | 65/161 |
| 4,162,700 A * | 7/1979 | Kahn | 164/155.6 |
| 4,729,732 A | 3/1988 | Schad | |
| RE33,237 E | 6/1990 | Delfer | |
| 5,176,858 A | 1/1993 | Tsukabe et al. | |
| 5,591,385 A * | 1/1997 | Arai et al. | 264/40.6 |
| 6,171,541 B1 | 1/2001 | Neter et al. | |
| 6,275,741 B1 | 8/2001 | Choi | |
| 6,299,431 B1 * | 10/2001 | Neter | 425/526 |
| 6,312,628 B1 * | 11/2001 | Wieder et al. | 264/37.27 |
| 6,391,244 B1 | 5/2002 | Chen | |
| 6,461,556 B1 * | 10/2002 | Neter | 264/237 |
| 6,464,919 B2 * | 10/2002 | Dubuis et al. | 264/237 |
| 6,558,598 B2 * | 5/2003 | Neter et al. | 264/237 |
| 6,663,813 B2 * | 12/2003 | Neter | 264/237 |
| 6,698,496 B2 * | 3/2004 | Takayama et al. | 164/312 |
| 6,746,643 B1 | 6/2004 | Kannari | |
| 6,770,239 B2 * | 8/2004 | Oueslati et al. | 264/538 |
| 6,802,705 B2 * | 10/2004 | Brand et al. | 425/547 |
| 6,854,705 B2 * | 2/2005 | Wieder | 251/63.6 |
| 6,884,823 B1 * | 4/2005 | Pierick et al. | 521/79 |
| 6,887,418 B2 * | 5/2005 | Olaru et al. | 264/328.1 |
| 6,916,168 B2 * | 7/2005 | Romanski et al. | 425/547 |
| 6,936,199 B2 * | 8/2005 | Olaru | 264/40.6 |
| 6,957,954 B2 * | 10/2005 | Neter et al. | 425/556 |
| 7,056,465 B2 * | 6/2006 | Unterlander et al. | 264/348 |
| 7,118,703 B2 * | 10/2006 | Trudeau | 264/328.14 |
| 7,156,647 B2 * | 1/2007 | Zoppas et al. | 425/526 |
| 7,168,942 B1 * | 1/2007 | Wieder | 425/552 |
| 7,220,378 B2 * | 5/2007 | Cochran et al. | 264/410 |
| 7,290,587 B2 * | 11/2007 | Ward | 164/122 |
| 7,303,387 B2 * | 12/2007 | Hutchinson et al. | 425/547 |
| 2005/0046056 A1 * | 3/2005 | Dong et al. | 264/1.33 |
| 2006/0029691 A1 * | 2/2006 | Sabin et al. | 425/570 |

\* cited by examiner

*Primary Examiner*—M. N. Von Buhr

(57) ABSTRACT

Disclosed, amongst other things, is a method, molding machine, and computer-readable product for post-mold cooling a molded article (2), comprising balancing cooling rates between portions (2', 2", 2''') of the molded article (2).

15 Claims, 4 Drawing Sheets

METHOD AND APPARATUS FOR CONTROLLING COOLING RATES DURING POST-MOLD COOLING OF A MOLDED ARTICLE

TECHNICAL FIELD

The present invention generally relates to, but is not limited to a method, molding machine, and computer-readable product for post-mold cooling a molded article, comprising balancing cooling rates between portions of the molded article to substantially reduce post-mold cooling related defects of the molded article, amongst other things.

BACKGROUND

Some injection molded articles, for example plastic preforms of the variety that are for blow molding into beverage bottles, require extended cooling periods to solidify into substantially defect-free molded articles. To the extent that the cooling of the molded article can be effected outside of the injection mold by one or more post-mold devices then the productivity of the injection mold may be increased (i.e. lower cycle time). A variety of such post-mold devices, and related methods, are known and have proven effective at the optimization of the injection molding machine cycle time.

In a typical injection molding system, such as the system 10 depicted with reference to FIG. 1, and as generally described in commonly assigned U.S. Pat. No. 6,171,541 (Inventor: NETER, Witold, et al.; Published: 9$^{th}$ Jan. 2001), just-molded, and hence partially cooled, molded articles 2 are ejected from the mold half 8, when the mold halves 8, 9 are spaced apart, and into molded article holders 50 (i.e. commonly known as a cooling holder, a take-off holder, or a cooling pipe, amongst others). The holders 50 are arranged on a post-mold device 15 (i.e. commonly known as an end-of-arm-tool, carrier plate assembly, removal device, post-cooling apparatus, amongst others), the post-mold device 15 configured to cyclically position the holders 50, arranged on a supporting plate 16, between an in-mold position between the mold halves 8, 9, to receive the molded articles 2, and an out-board position, as depicted, to allow the mold halves 8, 9 to close and begin another molding cycle. The construction and operation of the post-mold device 15, including those having multiple-positions, is generally described in commonly assigned U.S. Pat. No. RE33,237 (Inventor: DEFLER, Frank; Published: 19$^{th}$ Jun. 1990). Preferably, the molded articles 2 are held in the holders 50 until the molded articles 2 have cooled sufficiently that they may be ejected without risk of further deformation. The injection molding machine includes a controller 30, such as that described in commonly assigned U.S. Pat. No. 6,275,741 (Inventor: CHOI, Christopher; Published: 14th Aug. 2001), for controlling machine-control functions.

The cooling of the molded articles 2 may be assisted by the use of pins 14 for expelling a cooling fluid onto an inner portion of the molded articles 2, as shown with further reference to FIG. 2B. The pins 14 are arranged on another post-mold device 12 (i.e. commonly known as a COOLJET, a trademark of Husky Injection Molding Systems Ltd.), the post-mold device 12 arranged to be cyclically positioned between a cooling position, with the pins 14 positioned adjacent the portion of the molded articles 2, and an out-board position, as depicted. It is also known to use the molded article post-mold device 12 to extract the molded articles 2 from the holders 50 for a re-handling thereof, for instance, to a conveyor.

A portion of the post-mold device 15 depicting a holder 50 arranged on the supporting plate 16 is shown with reference to FIGS. 2A and 2B. The holder 50 is configured in accordance with the general teachings of commonly assigned U.S. Pat. No. 4,729,732 (Inventor: SCHAD, et al.; Published: 4$^{th}$ Mar. 1988). In particular, the holder 50 includes a tapered surface 52 defining a cavity for receiving a portion of the molded article 2, the surface 52 being smaller than the heated molded article. The holder includes a cooling structure operative to shrink the molded article, upon cooling, with the molded article sliding inside the cavity to fit snugly therein. The holder 50 further includes a suction structure adjacent a closed end of the cavity for maintaining the molded article in the holder 50.

As shown with reference to FIG. 2B, the cooling of the molded articles 2 may be assisted by the use of a coolant dispersion device 19 of a post-mold device 13 for dispersion of a coolant, such as cool air, around an exposed outer portion of the molded article; as generally described in commonly assigned U.S. Pat. No. 6,802,705 (Inventor: BRAND, Tiemo, et al.; Published: 12$^{th}$ Oct. 2004).

FIG. 2A depicts an initial position of the molded article 2 in the holder 50 immediately after having been received from the mold.

FIG. 2B depicts a completely seated position of the molded article 2 in the holder 50 after cooling, and related shrinkage, of the molded article 2.

The holder 50 comprises a holder 60 and an insert 70. The insert 70 is arranged in the holder 60 to provide the closed end of the cavity. The suction structure comprises a pressure channel 54 that extends through the insert 70, the channel 54 is connectable to an air pressure source 18, provided in a plate 16 of the post-mold device 15, via a pressure channel 18' configured in the holder 60. Likewise, the cooling structure comprises a coolant channel 62 configured around the holder 60, and enclosed by a holder sleeve 64, the coolant channel 62 connectable to a coolant source 17, provided in the plate 16, via a coolant channel 17' in the plate 16. The holder 60 and the insert 70 are held on the plate 16 by a fastener 72.

The coolant source 17 in the plate 16 is typically directly connected to a plant-wide coolant source. Typical plant-wide coolant sources include a chiller or a cooling tower to remove the heat added to the coolant from the molded article in the holder. Presently, faced with the problem of improving the efficiency of a molding cycle the common general knowledge in the molding art is to remove heat from the molded article holder as quickly as possible. The coolant, typically water, is preferably cooled to a temperature in the range of 6-10° C. In some high humidity molding environments the coolant may be kept warmer to avoid unwanted water condensation on the holder 50.

As can be seen with reference to FIGS. 2A and 2B, a first portion of the molded article 2' that is received in the cooled holder 50 will be cooled, by the holder 50, at a first rate while a second portion of the molded article 2" that is outside of the holder 50 will be cooled at a second rate. Under certain circumstances the second portion of the molded article 2" can take longer to cool than the first portion of the molded article 2'. The relative cooling between the first and second portions of the molded article 2', 2" may be affected by one or more variables such as the distribution of plastic in the molded article 2, the thermal profile of the molded article when ejected from the mold 8, 9, the relative first and second rates of cooling, amongst others. Whenever the time required for post-mold cooling the second portion of the molded article 2" is the limiting factor there is the risk that the first portion of the molded article 2' may become over-cooled. An over-cooled first portion of the molded article 2' is prone to deform.

Problems associated with cooling molded articles in the holder 50 may include localized sink marks and ovality.

With the relatively long molding cycle-times of the past it was generally possible to adjust the geometry of the cavity in the holder 50 to address the known defects. For instance, ovality defects may be addressed by adjusting the cavity in the holder 50 to be slightly smaller.

With increasingly aggressive molding cycle-time it is not always possible to address the defects by simple adjustment of the cavity geometry in the holder as adjusting the geometry for one defect may have the effect of making the another defect more prominent.

SUMMARY

According to a first aspect of the present invention, there is provided a method for post-mold cooling a molded article, comprising balancing cooling rates between portions of the molded article to substantially reduce post-mold cooling related defects of the molded article.

According to a second aspect of the present invention, there is provided a computer-readable product for use with a controller comprising a computer readable medium embodying one or more instructions executable by the controller (30), the one or more instructions including controller executable instructions for balancing cooling rates between portions of the molded article to substantially reduce post-mold cooling related defects of the molded article.

According to a third aspect of the present invention, there is provided a molding machine, comprising a post-mold device for cooling a portion of a molded article, a temperature control device for controlling the cooling rate imposed on one or more of the portions of the molded article by one or more post-mold devices to effect the balancing of the cooling rates between the portions.

A technical effect, amongst others, of the aspects of the present invention includes the ability to reduce the formation of defects in molded articles without having to resort to extending the molding cycle time.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

The drawings are not necessarily to scale and are may be illustrated by phantom lines, diagrammatic representations and fragmentary views. In certain instances, details that are not necessary for an understanding of the exemplary embodiments or that render other details difficult to perceive may have been omitted.

DETAILED DESCRIPTION OF THE EXEMPLARY EMBODIMENTS

Figure 3:
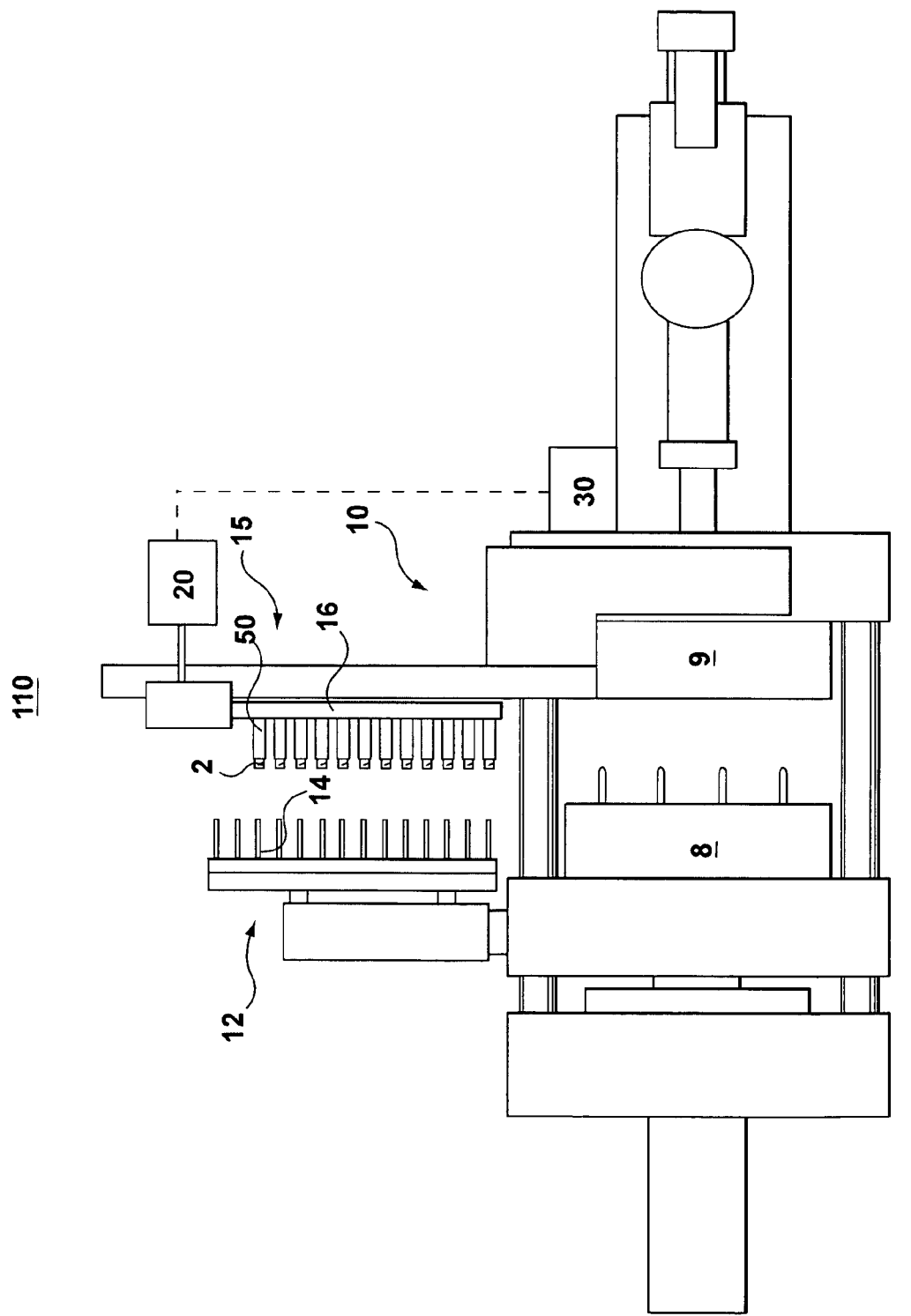
FIG. 3 is a top elevation view of an injection molding system in accordance with a preferred embodiment of the present invention.

FIG. 3 is an injection molding system 110 in accordance with a presently preferred embodiment of the present invention. The molding system 110 is similar to the known molding system 10 described hereinbefore which including the post-mold devices 12, 15. The molding system 110 further includes a temperature control device 20 for controlling the temperature of the holder 50, on post-mold device 15, to avoid imparting cooling related defects to the molded article 2.

Figure 1:
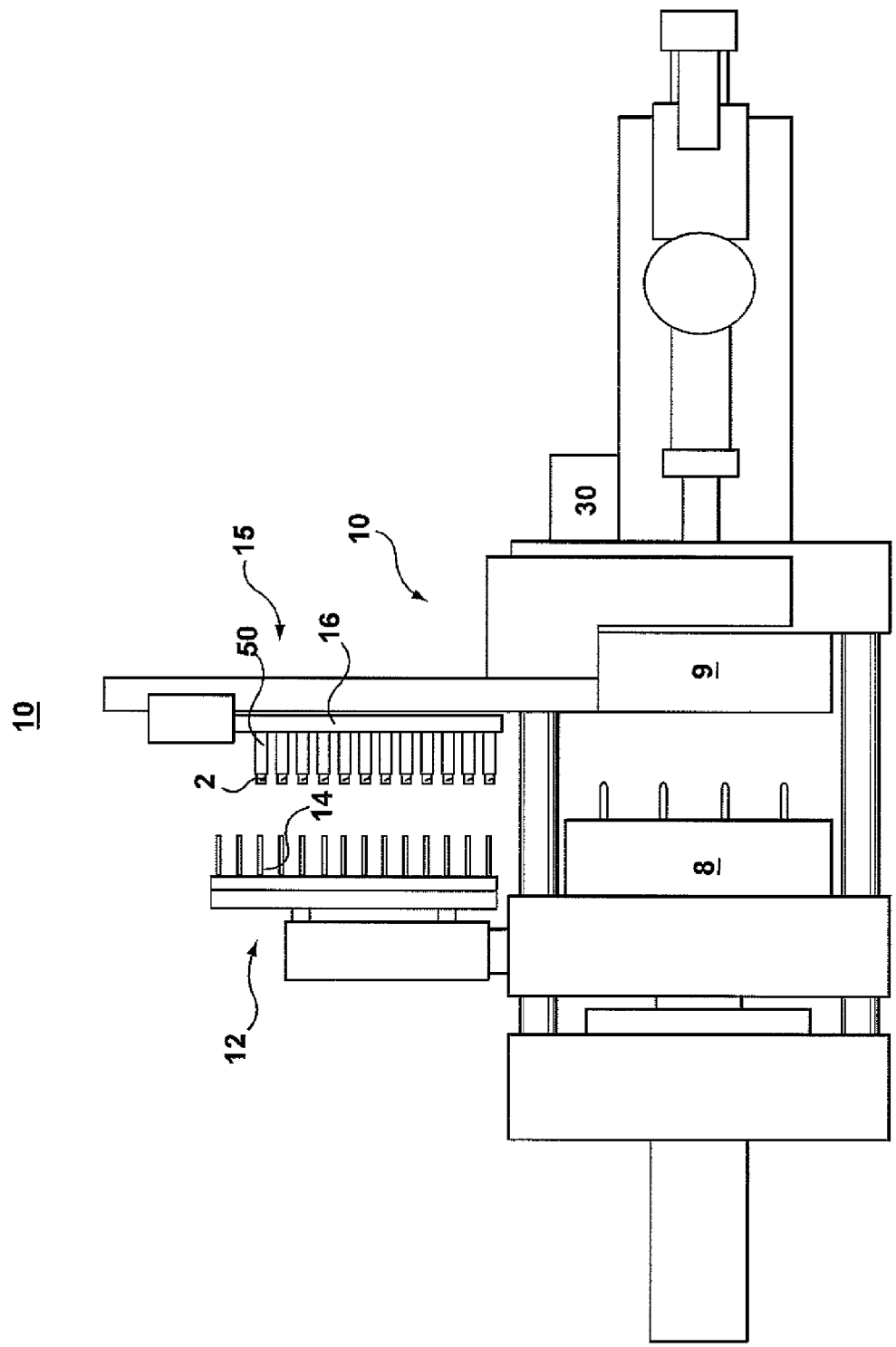
FIG. 1 is a top elevation view of a known injection molding system.
Figure 2A:
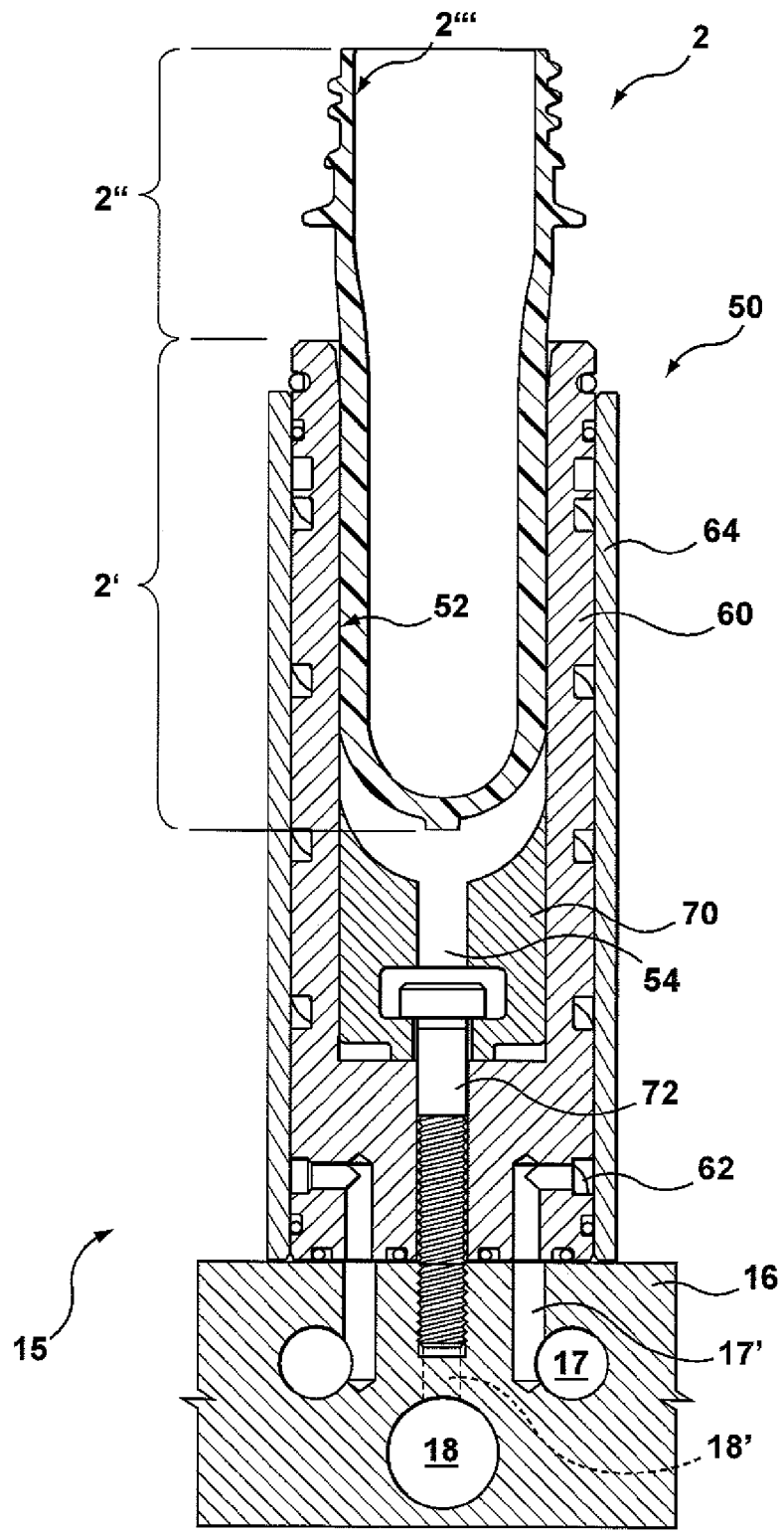
FIG. 2A is a section view through a post-mold device depicted in the injection molding system of FIG. 1 at a time before the molded article has completely seated therein.
Figure 2B:
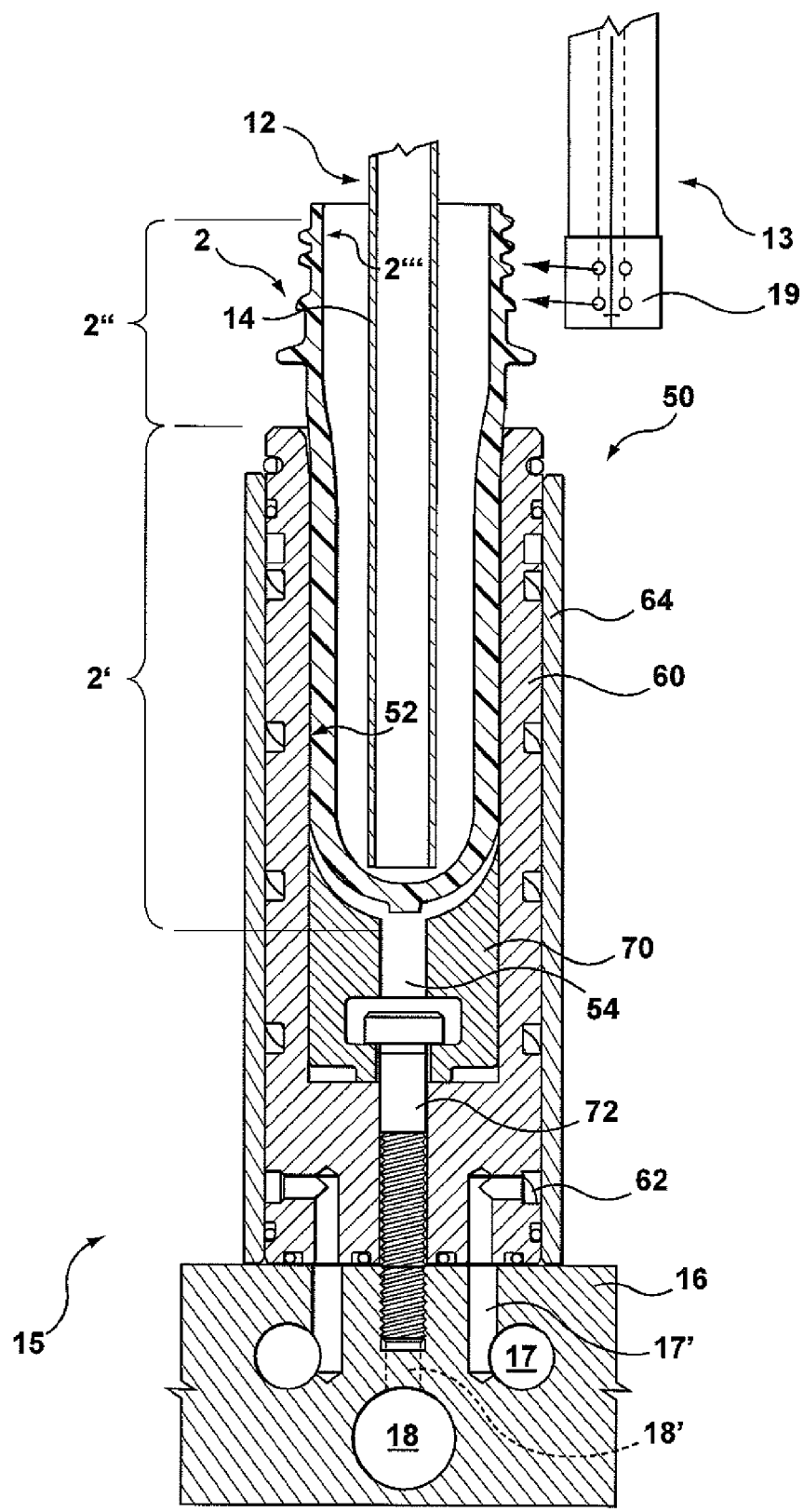
FIG. 2B is a section view through a post-mold device depicted in the injection molding system of FIG. 1 at a time after the molded article has completely seated therein.

The method in accordance with an embodiment of the present invention includes balancing cooling rates between the portions 2', 2", 2''' of the molded article 2, as shown with reference to FIG. 2B, to substantially reduce post-mold cooling related defects of the molded article.

The balancing of the cooling rates between portions 2', 2", 2''' is preferably controlled such that each of the portions of the molded article 2', 2", 2''' arrive at respective ejection temperatures, that substantially precludes post-ejection defects, at the substantially the same time.

The method preferably includes controlling the cooling rate imposed on one or more of the portions of the molded article 2', 2", 2''' by one or more post-mold devices 12, 13, 15 to effect the balancing of the cooling rates between the portions 2', 2", 2'''.

In accordance with an embodiment of the present invention the method includes arranging a first portion of the molded article 2' in a holder 50 of a post-mold device 15 and controlling the temperature of the holder 50 to avoid imparting cooling related defects to the molded article (2).

Preferably, the controlling of the temperature of the holder 50 minimizes a temperature differential in the molded article 2 at a transition between the first portion of the molded article 2' arranged in the holder 50 and a second portion of the molded article 2" that is outside of the holder 50.

Preferably, controlling the temperature of the holder 50 includes controlling the temperature of a coolant media that is circulated for controlling the temperature of the holder 50. The temperature control of the coolant media may be performed by circulating the coolant media through the temperature control device 20.

Alternatively, the controlling the temperature of the holder 50 includes the controlling the flow rate of a coolant that is circulated to control the temperature of the holder 50.

Preferably, controlling the temperature of the holder 50 includes selecting a temperature of the holder 50 whereby the first and second portions of the molded article 2', 2''' are controllably cooled at first and second cooling rates such that the molded article portions 2', 2''' arrive at ejection safe temperatures at substantially the same time.

A technical effect of the embodiment of the present invention is a reduction in the formation of defects in the molded article 2 that are related to post-mold cooling of the molded article.

In accordance with the embodiment of the present invention, the technical effect was prominent when the temperature of the coolant media for cooling of the holder 50 was heated above ambient temperature and below a glass temperature of a resin used to form the molded article 2. More preferably, the temperature of the holder 50 is selected to be between about 35° C. and 65° C. More preferably still the temperature of the holder 50 is selected to be about 50° C.

Preferably, the temperature of the holder 50 is homogenous. Alternatively, a subtle gradient along the molded article may be useful to reduce local defects, such as sink marks, while still avoiding ovality defects.

Preferably, the molding machine controller 30 controls the temperature control device 20 for controlling the temperature of the coolant media using closed-loop control. Alternatively, the temperature control may be open-loop control. Alternatively, the temperature control device 20 may include a dedicated controller, not shown, the dedicated controller may be operatively linked or entirely independent from the machine controller 30. Accordingly, the method of controlling the temperature of the coolant media may further include the sending coolant temperature set-points from a molding machine controller 30 to the dedicated controller in the temperature control device 20. In addition, operational feedback from the in the temperature control device 20 may be shared with the molding machine controller 30.

In accordance with an alternative embodiment of the invention, the cooling rate of one or both or the molded article portions (2", 2'") may be effected similarly by controlling the post-mold devices 13, 15. For example, the coolant flow rate, or coolant temperature may be controlled through the pin 14 and/or dispersion device 19 of post-mold devices 12, 13.

Any type of controller or processor may be used to balance the cooling rates between portions (2', 2", 2'") of the molded article (2), as described above. For example, one or more general-purpose computers, Application Specific Integrated Circuits (ASICs), Digital Signal Processors (DSPs), gate arrays, analog circuits, dedicated digital and/or analog processors, hard-wired circuits, etc., may receive input from the feedback signals described herein. Instructions for controlling the one or more of such controllers or processors may be stored in any desirable computer-readable medium and/or data structure, such floppy diskettes, hard drives, CD-ROMs, RAMs, EEPROMs, magnetic media, optical media, magneto-optical media, etc. An expert system may be implemented in the controller 30 to automatically control the post-mold devices 12, 13, 15 to adjust the cooling rates of the portions (2', 2", 2'") based upon quantitative and/or qualitative feedback on the state of the molded article 2.

The description of the exemplary embodiments provides examples of the present invention, and these examples do not limit the scope of the present invention. For example, balancing of cooling rates will be specific to both molded article (e.g. preform) design and molding cycle time. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims:

What is claimed is:

1. A method for post-mold cooling a molded article, the molded article including a first portion and a second portion thereof, the method comprising:
    receiving the molded article within a post-mold device, wherein the first portion is substantially received within the post-mold device and the second portion is substantially outside of the post-mold device;
    controlling a cooling rate imposed on the first portion of the molded article to effect balancing of cooling rates between the first portion and the second portion, whereby the first portion and the second portion arrive at respective ejection temperatures that substantially preclude post ejection defects at substantially the same time.

2. The method of claim 1, wherein the post-mold device includes a holder for receiving the first portion of the molded article, and wherein said controlling comprises controlling a temperature of the holder.

3. The method of claim 2, wherein said controlling the temperature comprises controlling a temperature of a coolant media that is circulated around the holder.

4. The method of claim 3, wherein said temperature of a coolant media is selected in a range between ambient temperature and a glass temperature of a resin used to form the molded article.

5. The method of claim 4, wherein said range is between about 35° C. and 65° C.

6. The method of claim 5, wherein said temperature of a coolant media is about 50° C.

7. The method of claim 2, wherein said controlling the temperature comprises controlling a flow rate of a coolant that is circulated around the holder.

8. The method of claim 2, wherein said controlling the temperature comprises controlling the temperature of the holder to have a thermal gradient along at least a portion of a length thereof.

9. The method of claim 2, wherein the post-mold device is a first post-mold device, and wherein the temperature is a first temperature; and wherein the second portion is cooled by a second post-mold device associated with a second temperature; and wherein said controlling a temperature of the holder comprises controlling the first temperature to decrease a temperature differential between the first temperature and the second temperature.

10. The method of claim 2, wherein the post-mold device is a first post-mold device, and wherein the temperature is a first temperature; and wherein the second portion is cooled by a second post-mold device associated with a second temperature; and wherein the method further comprises
    controlling the second temperature to decrease a temperature differential between the first temperature and the second temperature.

11. The method of claim 1, wherein said controlling comprises sending a coolant temperature setpoint from a molding machine controller to a temperature control device configured to control the post-mold device.

12. The method of claim 11, further including receiving operational feedback from the temperature control device at the molding machine controller.

13. A method for post-mold cooling a molded article, the molded article including a first portion and a second portion thereof, the method comprising:
    arranging the molded article for post-mold cooling using a first post-mold device and a second post-mold device, wherein the first portion is cooled by the first post-mold device and the second portion is cooled by the second post-mold device;
    controlling at least one of (i) a first cooling rate imposed on the first portion of the molded article by the first post-mold device and (ii) a second cooling rate imposed on the second portion of the molded article by the second post-mold device, to effect balancing of cooling rates between the first portion and the second portion, whereby the first portion and the second portion arrive at respective ejection temperatures that substantially preclude postejection defects therebetween at substantially the same time.

14. A molding machine comprising:
    a post-mold device for cooling a molded article, the molded article having a first portion and a second portions, the post-mold device configured to receive the molded article therewithin, wherein the first portion is substantially received within the post-mold device and the second portion is substantially outside of the post-mold device;

a controller configured to control a cooling rate imposed on the first portion of the molded article by the post-mold device to effect balancing of cooling rates between the first portion and the second portion, whereby the first portion and the second portion arrive at respective ejection temperatures that substantially preclude postejection defects at substantially the same time.

15. A computer-readable product for use in a controller configured to control a post-mold device, the computer-readable product comprising a computer-readable medium embodying one or more instructions executable by the controller, the one or more instructions configured to render the controller being operable to execute a method for post-mold cooling a molded article, the molded article including a first portion and a second portion thereof, the method comprising:

receiving the molded article within a post-mold device, wherein the first portion is substantially received within the post-mold device and the second portion is substantially outside of the post-mold device;

controlling a cooling rate imposed on the first portion of the molded article to effect balancing of cooling rates between the first portion and the second portion, whereby the first portion and the second portion arrive at respective ejection temperatures that substantially preclude postejection defects at substantially the same time.

* * * * *